April 24, 1956  G. H. STEARLEY  2,743,410
ALTERNATOR REGULATING SYSTEMS
Filed Aug. 28, 1953  2 Sheets-Sheet 1
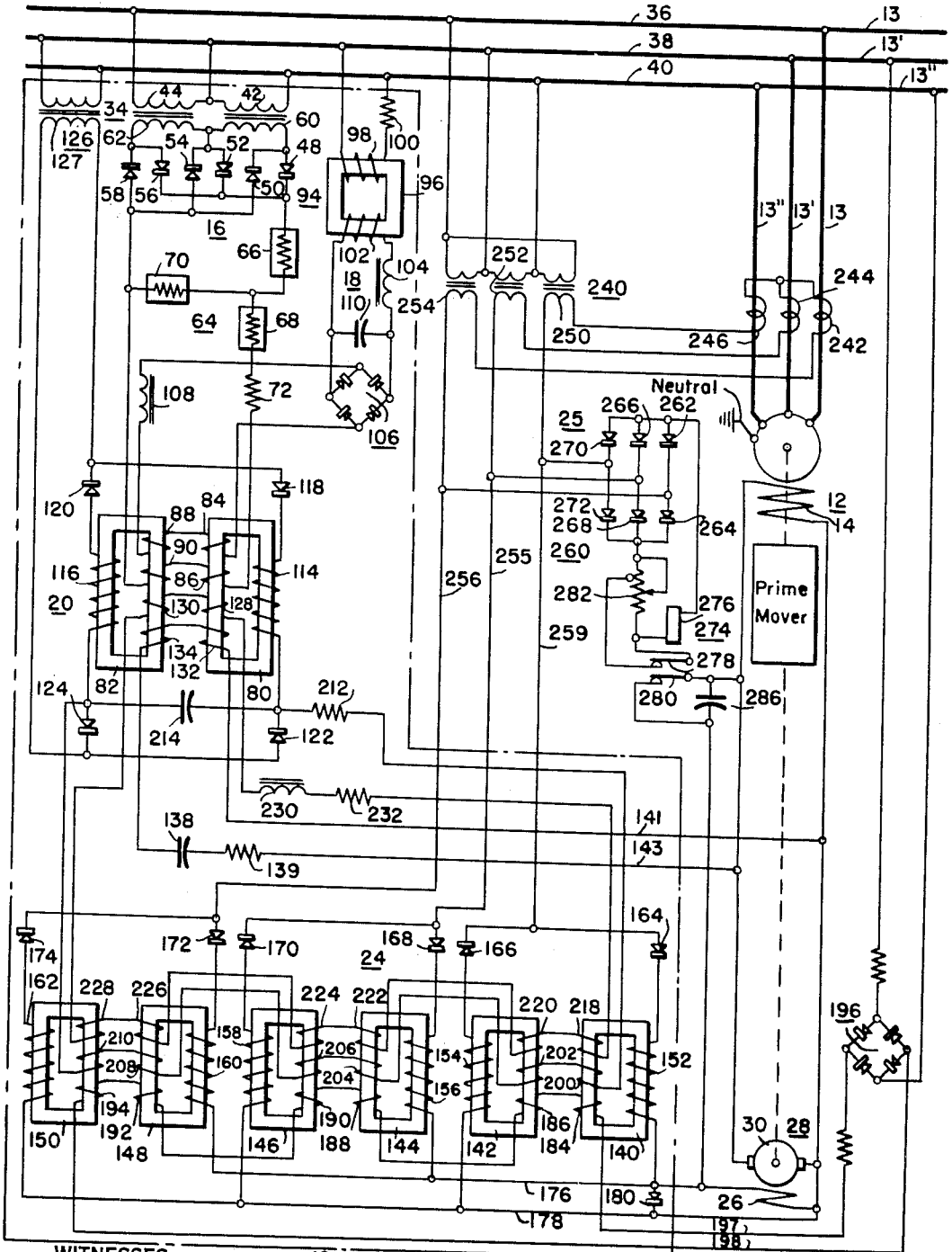
WITNESSES:
E. A. M'Closkey
R. W. Thomas
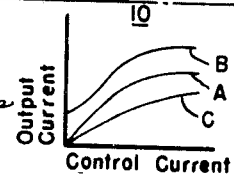
Fig. 2.
INVENTOR
George H. Stearley.
BY
Ezra J. Savage
ATTORNEY April 24, 1956

G. H. STEARLEY 2,743,410

ALTERNATOR REGULATING SYSTEMS

Filed Aug. 28, 1953

WITNESSES:

INVENTOR
George H. Stearley.
BY
ATTORNEY

2,743,410
Patented Apr. 24, 1956

2,743,410

ALTERNATOR REGULATING SYSTEMS

George H. Stearley, Lima, Ohio, assignor to Westinghouse Electric Corporation, East Pittsburgh, Pa., a corporation of Pennsylvania Application August 28, 1953, Serial No. 377,061

12 Claims. (Cl. 322—25)

This invention relates to regulator systems for maintaining the output voltage of an alternator substantially constant and more particularly to means associated with the regulator system for building up the output voltage of the alternator.

Magnetic amplifiers are currently being used in various types of static voltage regulators. Unlike many conventional regulators, which control the generator field power as taken from a direct-current source, the magnetic amplifier requires alternating current for its load windings. After an alternating-current generator is once generating its normal output voltage, a small portion of alternating current power generated is fed back through a magnetic amplifier to self-excite the machine or to supply the shunt field of a direct-current exciter, which in turn supplies field power to the field winding of the generator. However, a basic problem exists in getting the alternating-current generator voltage build-up to that level which enables the magnetic amplifier to supply the needed field power. Further, it is desirable that the means for obtaining such a build-up of the generator output voltage be completely automatic and that it be substantially unaffected by abnormal operating conditions such as the occurrence of a short circuit across the alternating-current generator phases.

An object of this invention is to provide for effectively and automatically building up the output voltage of an alternator.

Another object of this invention is to provide for effectively and automatically building up the output voltage of an alternator without causing a high alternating-current voltage transient overshoot, by rendering the exciter for the alternator self-excited when a measure of the sum of the load current and output voltage of the alternator is below a predetermined value and by putting the field winding of the exciter under the control of the regulator for the alternator when a measure of this sum is above the predetermined value.

A further object of this invention is to provide for effectively and automatically building up the output voltage of an alternator without causing a high alternating-current voltage transient overshoot, by connecting a separate source of direct current to the field winding of the alternator while a measure of the sum of the load current and output voltage of the alternator is below a predetermined value and then so connecting the field winding of the alternator that it is under the control of the regulator for the alternator when a measure of the sum of current and output voltage of the alternator is above the predetermined value.

A still further object of this invention is to provide for preventing a high alternating-current voltage transient overshoot of an alternator upon the removal of a line fault or short circuit on the output side of the alternator, by rendering the control apparatus that controls the building up of the alternator responsive to a measure of the sum of the output voltage and the load current or short circuit current of the alternator so that when the fault or short circuit exists the control apparatus does not effect a raising of the voltage across the field winding of the alternator but rather continues to maintain the voltage across the field winding of the alternator under the control of the regulator for the alternator.

Other objects of this invention will become apparent from the following description when taken in conjunction with the accompanying drawings in which:

Figure 1 is a schematic diagram of circuits and apparatus illustrating an embodiment of the teachings of this invention;

Fig. 2 is a graph representing the manner in which the output current from the second stage amplifier illustrated in Figure 1 varies with changes in the magnitude of the control current supplied thereto.

Figure 3:
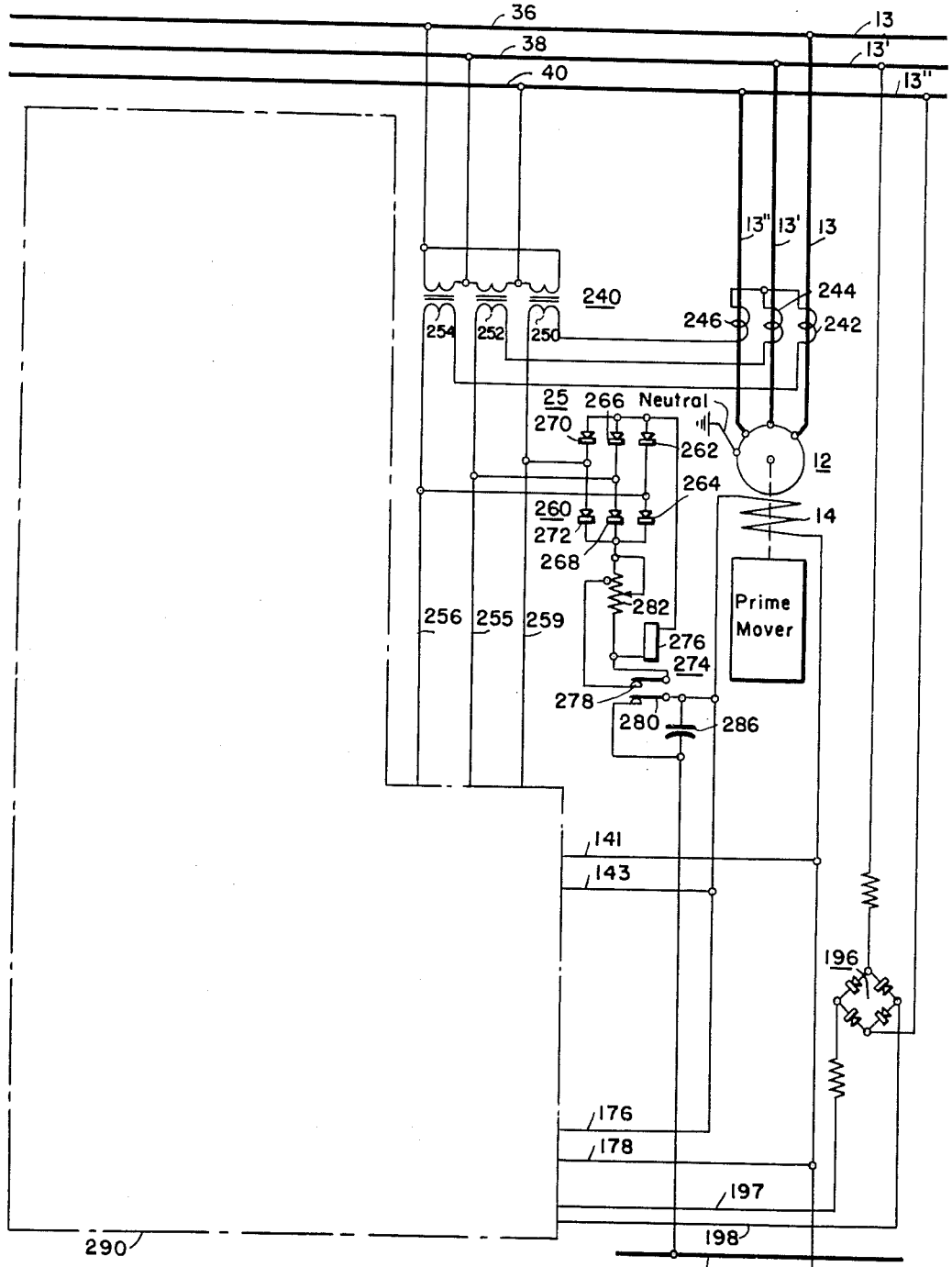
Fig. 3 is a schematic diagram of circuits and apparatus illustrating another embodiment of the teachings of this invention.

Referring to Figure 1 there is illustrated a control system 10 for effectively building-up the output voltage of an alternator 12 and for maintaining the output voltage of the alternator, having a field winding 14, substantially constant. In the particular embodiment illustrated the alternator 12 is a three-phase generator disposed to supply energy to load conductors 13, 13' and 13".

The control system 10, in general, comprises a three-phase sensing network 16 responsive to the output voltage of the generator 12, a voltage reference network 18 responsive to the output voltage of the generator 12 and disposed to produce at its output a voltage which remains substantially constant over a wide range of variation in the magnitude and frequency of its input voltage, a first stage saturable reactor 20 responsive to the current outputs of the sensing network 16 and the reference network 18 and so constructed that the current outputs of the networks 16 and 18 produce opposing fluxes in the saturable reactor 20 which have a predetermined difference when the output voltage of the generator 12 is at its regulated value, the flux produced by the current output of the sensing network 16 always being greater in magnitude than the flux produced in the saturable reactor 20 by the current output of the reference network 18, a second-stage three-phase saturable reactor 24, and control means 25 for effecting a build-up of the output voltage of the generator 12, the control means 25 being responsive to both the output voltage of the generator 12 and the load current of the generator 12. The control means 25 and the manner in which it functions to build up the output voltage of the generator 12 in accordance with the teachings of this invention will be described hereinafter.

In the embodiment illustrated, the saturable reactor 20 is a self-saturating, full-wave magnetic amplifier. The second-stage three-phase saturable reactor 24, which in the preferred embodiment is a full-wave self-saturating magnetic amplifier, is responsive to the output of the magnetic amplifier 20 and supplies current to the field winding 26 of an exciter 28. In order to render the field winding 14 of the generator 12 responsive to the current flow through the field winding 26 of the exciter 28 and thus maintain the output voltage of the generator 12 substantially constant, an armature 30 of the exciter 28 is electrically connected to the field winding 14. The exciter 28 also functions as a source of energy for heavily exciting the field winding 14 of the generator 12 so as to effectively build up the output voltage of the generator 12, as will be explained hereinafter.

In order to render the sensing network 16 responsive to the output voltage of the generator 12, a potential transformer 34 is electrically connected to the load conductors 13, 13' and 13" through line conductors 36, 38 and 40, respectively. In particular, the transformer 34 comprises primary winding sections 42 and 44, the primary winding section 42 being electrically connected to the line conductors 38 and 40 and the primary winding section 44 being electrically connected to the line conductors 36 and 38. For the purpose of rectifying the output of the transformer 34, rectifiers 48, 50, 52, 54, 56 and 58 are electrically connected to secondary winding sections 60 and 62 of the transformer 34.

Temperature compensating means 64, comprising the temperature responsive resistors 66, 68 and 70 and the resistor 72, is provided in order to compensate for changes in the output currents of the sensing and reference networks 16 and 18 due to changes in the temperature of the surrounding air. By providing such compensation, a resultant flux of predetermined magnitude is produced in the magnetic amplifier 20 by the output currents of the networks 16 and 18 when the output voltage of the generator 12 is at its regulated value, irrespective of the magnitude of the temperature of the surrounding air. The temperature compensating means 64 is provided in combination with the sensing network 16 rather than in conjunction with the reference network 18. The reason for this is that the insertion of the temperature compensating means 64 in the reference network 18 would affect the accuracy of the network 18. In practice, the components of the networks 16 and 18 are so constructed as to properly cooperate with the temperature compensating means 64 and thereby obtain the desired temperature compensation.

In this instance, the magnetic amplifier 20 comprises magnetic core members 80 and 82 which have disposed in inductive relationship therewith control windings 84 and 86, and control windings 88 and 90, respectively. In order to render the control windings 86 and 90 responsive to the current output of the sensing network 16, these control windings are connected in series circuit relationship, one end of the series circuit being electrically connected to one end of the resistor 72 and the other end of this series circuit being electrically connected to the rectifier 58. As illustrated, the resistors 66 and 68 are connected in series circuit relationship, one end of this series circuit being connected to the end of the resistor 72 remote from the connection with the control windings 86 and 90, and the other end of this series circuit is connected to the rectifier 48. The resistor 70, in turn, is electrically connected to the junction point of the resistors 66 and 68 and to the rectifier 58.

The manner in which the three-phase sensing circuit 16 supplies direct current to the control windings 86 and 90 of the magnetic amplifier 20 can be better understood by tracing the flow of current through the sensing network 16. For instance, assuming the left end of the secondary winding section 62 is at a positive polarity, current will flow from this end of the section through the rectifier 56, the resistors 66, 68 and 72, the control windings 86 and 90 of the magnetic amplifier 20, and the rectifier 54, to the other end of the secondary winding section 62. During the second phase in which the left end of the secondary winding section 60 is at a positive polarity, current will flow from this left end through the rectifier 52, the resistors 66, 68 and 72, the control windings 86 and 90 of the magnetic amplifier 20, and the rectifier 50 to the other end of the secondary winding section 60. On the other hand, during the third phase in which the right end of the secondary winding section 60 is at a positive polarity, current will flow from this right end through the rectifier 48, the resistors 66, 68 and 72, the control windings 86 and 90, and the rectifier 58 to the left end of the secondary winding section 62.

Referring again to the reference network 18, it comprises a saturating transformer 94 having a magnetic core member 96, preferably formed from square looped core material. In order to magnetically saturate the core member 96, in accordance with the voltage between the line conductors 38 and 40, a primary winding 98 is disposed in inductive relationship with the core member 96. In operation, the voltage between the line conductors 38 and 40 is always of sufficient magnitude to affect a substantially complete saturation of the magnetic core member 96.

When the voltage between the line conductors 38 and 40 is of sufficient magnitude to effect a substantially complete saturation of the core member 96, the impedance of the primary winding 98 is extremely low. Therefore, it is necessary that a resistance member 100 be connected in series circuit relationship with the primary winding 98 in order to limit the magnitude of the current flow through the primary winding 98 and thus prevent excessive heating and resulting damage to the primary winding 98.

In order to produce an average output voltage from the saturating transformer 94, which is substantially independent of the magnitude of its input voltage, a secondary winding 102 is disposed in inductive relationship with the core member 96. The reason the average output voltage across the secondary winding 102 is substantially constant irrespective of the magnitude of the voltage between the line conductors 38 and 40, is that the input voltage is always of such magnitude as to effect a substantially complete saturation of the core member 96. This can be better understood by considering that it takes a predetermined number of volt-seconds to saturate the core member 96, and if the input voltage increases, the core member 96 will saturate within a predetermined time interval which will be of shorter duration than in the case when the input voltage is of lesser magnitude. Further, the areas under the voltage-time curves for the primary winding 98 are of substantially equal magnitude irrespective of the magnitude of the voltage between the line conductors 38 and 40, since the same predetermined volt-seconds are required to saturate the core member 96 each time. Therefore, since there is always a substantially complete saturation of the core member 96 for all magnitudes of voltage between the line conductors 38 and 40 above a predetermined value, the impedance of the secondary winding 102 and thus the average voltage thereacross remains substantially constant for varying magnitudes of voltage between the line conductors 38 and 40. However, even though the average output voltage across the secondary winding 102 is substantially constant irrespective of the magnitude of the voltage between the line conductors 38 and 40, still the magnitude of the average voltage across the secondary winding 102 does vary with changes in the frequency of the voltage between the line conductors 38 and 40.

In order to integrate the output voltage of the saturating transformer 94 and thus maintain the output voltage of the voltage reference device 18 substantially constant over a wide range of variation in the frequency of the input voltage between the line conductors 38 and 40, a linear iron core inductance member 104 is electrically connected between the secondary winding 102 and a full-wave dry-type rectifier 106 having input and output terminals. In particular, one end of the inductance member 104 is electrically connected to one end of the secondary winding 102, the other end of the inductance member 104 being electrically connected to one of the input terminals of the rectifier 106. The other input terminal of the rectifier 106 is electrically connected to the other end of the secondary winding 102.

In order for the inductance member 104 to function properly as an integrating device and thus have its impedance vary directly as the frequency of the voltage across the secondary winding 102 of the saturating transformer 94, the value of the reactive impedance for the inductance member 104 must be large as compared to the resistance value presented by the control windings 84 and 88 of the magnetic amplifier 20 and by an inductance member 108. It is to be noted that although the reference network 18 maintains the voltage across the control windings 84 and 88 substantially constant over a wide range in the magnitude and frequency of the input voltage as it appears between the line conductors 38 and 40, it also has a large power output for a given power input, this feature being obtained by providing the integrating means or inductance member 104 which has an extremely low power loss.

Thus, as is desired, substantially all the power output from the saturating transformer 94 is supplied to the control windings 84 and 88 of the magnetic amplifier 20.

In order to assure that the voltage reference network 18 will present a high impedance to the magnetic amplifier 20, the linear iron core inductance member 108 is provided. In this instance, the inductance member 108 is connected in series circuit relationship with the control windings 84 and 88 of the magnetic amplifier 20, this series circuit being so electrically connected across the output terminals of the rectifier 106 that the control windings 84 and 88 are responsive to the output current of the reference network 18. As hereinbefore mentioned, the output current of the sensing network 16 that flows through the control windings 86 and 90 produces flux in the core members 80 and 82, respectively, which is always of greater magnitude than the flux produced in these core members by the output current of the reference network 18 which flows through the control windings 84 and 88, the fluxes produced by the current flow through the control windings 86 and 90 opposing the fluxes produced by the current flow through the control windings 84 and 88, respectively. The inductance member 108 also presents a low impedance, as seen from the input side of the rectifier 106. This condition meets the requirement that the load be of low impedance as compared to the inductance member 104, in order for the inductance member 104 to function properly as an integrating means. Not only does the inductance member 108 provide the desired impedance, but it likewise functions to filter the rectified output current from the rectifier 106.

The insertion of the inductance member 108 tends to decrease the accuracy of the reference network 18, therefore, in order to obtain an extremely constant output voltage for the reference network 18, a capacitor 110 is electrically connected in circuit relationship with the input terminals of the rectifier 106. It is to be noted that the capacitor 110 and the inductance member 104 do not form a resonant circuit.

Again referring to the magnetic amplifier 20, self-saturation of this magnetic amplifier is obtained by disposing in inductive relationship with the core members 80 and 82, load windings 114 and 116, respectively, and connecting in series circuit relationship therewith self-saturating rectifiers 118 and 120, respectively, so that current flows in only one direction through the load windings 114 and 116. Load rectifiers 122 and 124 are also connected in circuit relationship with the load windings 114 and 116, respectively, in order to provide a direct current output for the magnetic amplifier 20. For the purpose of supplying energy to the load windings 114 and 116, a potential transformer 126 having a secondary winding 127 is provided. In particular, one end of the secondary winding 127 is electrically connected to the junction point of the self-saturating rectifiers 118 and 120. The other end of the secondary winding 127 is electrically connected to the junction point of the load rectifiers 122 and 124.

The magnetic core members 80 and 82 of the magnetic amplifier 20 also have disposed in inductive relationship therewith damping windings 128, 130, 132 and 134. In order to prevent oscillations in the regulating system by cancelling out a portion of the time delays effected by the generator 12, the exciter 28, and the magnetic amplifiers 20 and 24, the damping windings 132 and 134 are connected in series circuit relationship with a capacitor 138 and a resistor 139, this series circuit being electrically connected across the armature 30 of the exciter 28 by means of conductors 141 and 143. The functioning of the damping windings 128 and 130 of the magnetic amplifier 20 which substantially cancel out the remaining portion of the time delays brought about by the generator 12, the exciter 28, and the magnetic amplifiers 20 and 24, will be described hereinafter.

As hereinbefore mentioned, the three-phase magnetic amplifier 24 is responsive to the output of the magnetic amplifier 20. As illustrated, the magnetic amplifier 24 comprises magnetic core members 140, 142, 144, 146, 148 and 150, which have disposed in inductive relationship therewith load windings 152, 154, 156, 158, 160 and 162, respectively, the load windings 152, 154, 156, 158, 160 and 162 receiving energy from the output of the generator 12. Thus, the magnetic amplifier 24 receives energy from the output of the generator 12, otherwise the magnetic amplifier 24 could not function to supply energy to the field winding 26 of the exciter 28. In this instance, the load windings 152, 154, 156, 158, 160 and 162 have connected in series circuit relationship therewith self-saturating rectifiers 164, 166, 168, 170, 172 and 174, respectively, in order to insure that current flows in only one direction through the respective load windings. As illustrated, the load windings 152, 156, and 160 are so connected to a conductor 176 and the load windings 154, 158 and 162 are so connected to a conductor 178 that the output current of the magnetic amplifier 24 flows in only one direction through the field winding 26 of the exciter 28. A commutating rectifier 180 is electrically connected across the field winding 26 of the exciter 28 for commutating the current through the field winding 26. In other words, the rectifier 180 discharges the field 26 cyclically, thus preventing the flow of unwanted feedback into the load windings 152, 154, 156, 158, 160 and 162 which would render the magnetic amplifier 24 unstable.

In order to bias the magnetic amplifier 24 a predetermined amount, the magnetic core members 140, 142, 144, 146, 148 and 150 have disposed in inductive relationship therewith biasing windings 184, 186, 188, 190, 192 and 194, respectively. As illustrated, the biasing windings 184, 186, 188, 190, 192, and 194 are connected in series circuit relation with one another across the output terminals of a full-wave dry-type rectifier 196 by means of conductors 197 and 198, the input terminals of the rectifier 196 being electrically connected to the load conductors 13′ and 13″ for receiving energy therefrom.

For the purpose of saturating the magnetic core members 140, 142, 144, 146, 148 and 150 in accordance with the output current of the magnetic amplifier 20 and thus in accordance with the magnitude of the output voltage of the generator 12, control windings 200, 202, 204, 206, 208 and 210 are disposed in inductive relationship with the core members 140, 142, 144, 146, 148 and 150, respectively. As illustrated, the control windings 200, 202, 204, 206, 208, and 210 are so disposed on their respective core members that current flow therethrough produces flux which opposes the flux produced by the current flow through the associated biasing windings 184, 186, 188, 190, 192, and 194, respectively. In this instance, the control windings 200, 202, 204, 206, 208 and 210 are connected in series circuit relationship with a resistor 212, one end of this series circuit being electrically connected to the junction point of the load winding 114 and the load rectifier 122, and the other end of the series circuit being electrically connected to the junction point of the load winding 116 and the load rectifier 124 of the magnetic amplifier 20. Also connected to the junction point of the load winding 114 and the load rectifier 122 and to the junction point of the load winding 116 and the load rectifier 124 is a capacitor 214 which in combination with the resistor 212 constitutes a filter, having a minimum of delay, and which functions to decouple the inductance of the magnetic amplifier 20 from the inductance of the magnetic amplifier 24.

In order to obtain a voltage which is proportional to the derivative of the output voltage of the magnetic amplifier 24, damping windings 218, 220, 222, 224, 226 and 228 are disposed in inductive relationship with the magnetic core members 140, 142, 144, 146, 148, and 150, respectively. The voltage induced in the damping windings 218, 220, 222, 224, 226, and 228 by a sudden change in the magnitude of the current flow through the control windings 200, 202, 204, 206, 208, and 210, which induced voltage is proportional to the derivative of the output voltage of the magnetic amplifier 24, is delayed by a network comprising a linear inductance member 230 and a resistor 232. As illustrated, the damping windings 218, 220, 222, 224, 226 and 228 of the magnetic amplifier 24, the damping windings 130 and 128 of the magnetic amplifier 20 and the linear inductance member 230 and the resistor 232 are all connected in series circuit relationship with one another, with the damping windings 128 and 130 being so disposed on their respective core members 80 and 82 that the current flow therethrough produces a flux in the core members which opposes the change in the flux produced by the current flow through the control windings 86 and 90 of the magnetic amplifier 20. However, the current flow through the damping windings 132 and 134 of the magnetic amplifier 20 produces a flux in the core members 80 and 82, respectively, which opposes the flux produced by the current flow through the control windings 86 and 90, respectively when there is an increase in the magnitude of the voltage across the field winding 14 of the generator 12 in the positive direction.

By providing the damping windings 128 and 130 of the magnetic amplifier 20 and the damping windings 218, 220, 222, 224, 226 and 228 of the magnetic amplifier 24 and by interconnecting them by means of the delay network comprising the inductance member 230 and the resistor 232, the stability of the regulating system 10 is greatly increased without sacrificing the gain of the magnetic amplifiers 20 and 24. This is an important feature both from the standpoint of the operation of the apparatus, as well as from the standpoint of the original cost of the apparatus.

The effect of applying the combined output voltages of the potential transformer 240 and the current transformers 242, 244 and 246 to the load windings 152, 154, 156, 158, 160 and 162 of the magnetic amplifier 24 can be better understood by referring to Fig. 2 of the drawings, which illustrates the manner in which the magnitude of the output current from the magnetic amplifier 24, and thus the magnitude of the current flow through the field winding 26 of the exciter 28, varies with changes in the magnitude of the current flow through the control windings 200, 202, 204, 206, 208, and 210 of the magnetic amplifier 24, under various conditions. For instance, a curve A represents the manner in which the output current of the magnetic amplifier 24 varies with changes in the magnitude of the current flow through the control windings 200, 202, 204, 206, 208, and 210 when the current transformers 242, 244, and 246 are not provided. However, when the current transformers 242, 244 and 246 are provided and are responsive to the load current of the generator 12 and are interconnected with the potential transformer 240 and with the magnetic amplifier 24, as illustrated in Fig. 1, the output current of the magnetic amplifier 24 varies with changes in the magnitude of the control current through the control windings 200, 202, 204, 206, 208 and 210, as represented by a curve B illustrated in Fig. 2.

It is to be understood that if there is no generator load current flowing, the current transformers 242, 244, and 246 absorb a certain amount of the output voltage of the potential transformer 240. A curve C illustrates the manner in which the output current of the magnetic amplifier 24 varies with changes in the magnitude of the current flow through the control windings 200, 202, 204, 206, 208, and 210 when the load current flowing from the generator 12 is of zero magnitude and the current transformers 242, 244, and 246 are connected as illustrated.

Another advantage is also to be gained by providing the potential transformer 240 and the current transformers 242, 244 and 246 and properly interconnecting them with the magnetic amplifier 24. This advantage is that if the load should, for some reason, become shorted, thereby reducing the output voltage of the transformer 240 to zero, the current transformers 242, 244 and 246 continue to supply voltage to the load windings 152, 154, 156, 158, 160 and 162 of the magnetic amplifier 24, thereby providing field excitation for the generator 12, even though the load is shorted. Thus, by providing this equipment, a shut-down of the generator 12 is prevented.

The manner in which the load windings 152, 154, 156, 158, 160, and 162 of the magnetic amplifier 24 receive energy from the potential transformer 240, which includes secondary winding sections 250, 252, and 254, and from the current transformers 242, 244, and 246 can be better understood by tracing the current flow through these load windings during various phases of the output voltage of the transformer 240. Assuming the right end of the secondary winding section 254 of the transformer 240 is at a positive polarity with respect to the left end of the section 254, then current flows from this end through the current transformer 242, the current transformer 244, the secondary winding section 252, a conductor 255, the self-saturating rectifier 168 of the magnetic amplifier 24, the load winding 156, the conductor 176, the field winding 26 of the exciter 28, the conductor 178, the load winding 162 of the magnetic amplifier 24, the self-saturating rectifier 174, and a conductor 256, to the left end of the secondary winding section 254. When the right end of the secondary winding section 254 is at a positive polarity with respect to the left end of the section 254, current also flows from this right end through the current transformer 242, the current transformer 246, the secondary winding section 250, a conductor 259, the self-saturating rectifier 164 of the magnetic amplifier 24, the load winding 152, the conductor 176, the field winding 26 of the exciter 28, the conductor 178, the load winding 162 of the magnetic amplifier 24, the self-saturating rectifier 174, and the conductor 256 back to the left end of the secondary winding section 254 of the transformer 240.

During the next phase of the output voltage of the transformer 240 in which the right end of the secondary winding section 252 is at a positive polarity with respect to the left end of the section 252, current flows from this right end through the current transformer 244, the current transformer 246, the secondary winding section 250, the conductor 259, the self-saturating rectifier 164 of the magnetic amplifier 24, the load winding 152, the conductor 176, the field winding 26 of the exciter 28, the conductor 178, the load winding 158 of the magnetic amplifier 24, the self-saturating rectifier 170, and the conductor 255 back to the left end of the secondary winding section 252 of the transformer 240. When the right end of the secondary winding section 252 is at a positive polarity with respect to the left end of the section 252, current also flows from this right end through the current transformer 244, the current transformer 242, the secondary winding section 254 of the transformer 240, the conductor 256, the self-saturating rectifier 172 of the magnetic amplifier 24, the load winding 160, the conductor 176, the field winding 26 of the exciter 28, the conductor 178, the load winding 158 of the magnetic amplifier 24, the self-saturating rectifier 170, and the conductor 255, back to the left end of the secondary winding section 252 of the transformer 240.

During the next phase of the output voltage of the transformer 240 in which the right end of the secondary winding section 250 is at a positive polarity with respect to the left end of the section 250, current flows from this right end through the current transformer 246, the current transformer 244, the secondary winding section 252, the conductor 255, the self-saturating rectifier 168 of the magnetic amplifier 24, the load winding 156, the conductor 176, the field winding 26 of the exciter 28, the conductor 178, the load winding 154 of the magnetic amplifier 24, the self-saturating rectifier 166, and the conductor 259 back to the left end of the secondary winding section 250 of the transformer 240. When the right end of the secondary winding section 250 is at a positive polarity with respect to the left end of the section 250, current also flows from this right end through the current transformer 246, the current transformer 242, the secondary winding section 254, the conductor 256, the self-saturating rectifier 172 of the magnetic amplifier 24, the load winding 160, the conductor 176, the field winding 26 of the exciter 28, the conductor 178, the load winding 154 of the magnetic amplifier 24, the self-saturating rectifier 166, and the conductor 259, back to the left end of the secondary winding section 250 of the transformer 240.

In accordance with the teachings of this invention the control means 25 is provided in order to effectively and automatically build up the output voltage of the generator 12 without causing a high alternating-current transient voltage overshoot, as will be explained hereinafter. In operation, the control means 25 is responsive to both the output voltage of the generator 12 and to the load current of the generator 12.

In general, the control means 25 comprises the current transformers 242, 244 and 246, which are responsive to the load current of the generator 12 or to the current flowing in the load conductors 13, 13' and 13'' when a three-phase short circuit exists or when a line-to-neutral short circuit exists. The control means 25 also includes the potential transformer 240, which is responsive to the output voltage of the generator 12, a three-phase dry-type rectifier 260 having rectifier components 262, 264, 266, 268, 270 and 272, the rectifier 260 being responsive to the output voltages of the current transformers 242, 244 and 246 and to the output voltages of the potential transformer 240, so as to produce at the output of the rectifier 260 a direct-current voltage, that is a measure of the sum of the output voltage and load current of the generator 12, or that is a measure of the short circuit current flowing in the load conductors 13, 13' and 13'' and a relay 274 having an operating coil 276 and two sets of contacts 278 and 280, the relay 274 being responsive to the output of the rectifier 260. In this embodiment, the set of contacts 280 of the relay 274 is interconnected with the exciter 28, in particular with the field winding 26 and with the armature 30 of the exciter 28 so as to render the exciter 28 self-excited when a measure of the sum of the output voltage and load current of the generator 12 is below a predetermined value.

In order to limit the current flow through the operating coil 276 of the relay 274 when a measure of the sum of the output voltage and load current of the generator 12 is above the aforementioned predetermined value, or when a three-phase short circuit or line-to-neutral short circuit exists, a variable resistor 282 is connected in series circuit relationship with the operating coil 276, the series circuit being connected across the output of the rectifier 260. By thus limiting the current flow through the operating coil 276 under such conditions in which the output voltage of the rectifier 260 is relatively high, overheating of the operating coil 276 is prevented since the resistor 282 absorbs a part of the output voltage of the rectifier 260. However, in order to assure proper timing of the operation of the relay 274, a detent circuit is provided. This detent circuit comprises the set of contacts 278 and the circuit means for connecting the set of contacts 278 across the resistor 282 so that a predetermined portion of the resistor 282 is by-passed when the measure of the sum of the output voltage and load current of the generator 12 is below the predetermined value. In this instance, a capacitor 286 is connected across the set of contacts 280 in order to prevent arcing of the contacts.

The manner in which the rectifier 260 is responsive to the output voltages of the current transformers 242, 244 and 246 and to the output voltages of the potential transformer 240 can be better understood by tracing the circuits interconnecting these various components. For instance, assuming the measure of the sum of the output voltage and load current of the generator 12 is below the predetermined value, if the right end of the secondary winding section 254 of the transformer 240 is at a positive polarity with respect to the left end of the section 254, then current flows from this right end through the current transformer 242, the current transformer 244, the secondary winding section 252 of the transformer 240, the conductor 255, the rectifier component 268 of the rectifier 260, the set of contacts 278, the operating coil 276 of the relay 274, the rectifier component 262 of the rectifier 260, and the conductor 256 to the left end of the secondary winding section 254 of the transformer 240. When the right end of the secondary winding section 254 is at a positive polarity with respect to the left end of the section 254, current also flows from this right end through the current transformer 242, the current transformer 246, the secondary winding section 250 of the transformer 240, the conductor 259, the rectifier component 272 of the rectifier 260, the set of contacts 278, the operating coil 276 of the relay 274, the rectifier component 262 of the rectifier 260, and the conductor 256, to the left end of the secondary winding section 254 of the transformer 240.

During the next phase of the output voltage of the transformer 240 in which the right end of the secondary winding section 252 is at a positive polarity with respect to the left end of the section 252, current flows from this right end through the current transformer 244, the current transformer 246, the secondary winding section 250 of the transformer 240, the conductor 259, the rectifier component 272 of the rectifier 260, the set of contacts 278, the operating coil 276 of the relay 274, the rectifier component 266 of the rectifier 260, and the conductor 255, to the left end of the secondary winding section 252 of the transformer 240. When the right end of the secondary winding section 252 is at a positive polarity with respect to the left end of the section 252, current also flows from this right end through the current transformer 244, the current transformer 242, the secondary winding section 254 of the transformer 240, the conductor 256, the rectifier component 264 of rectifier 260, the set of contacts 278, the operating coil 276 of the relay 274, the rectifier component 266 of the rectifier 260, and the conductor 255 to the left end of the secondary winding section 252 of the transformer 240.

During the third phase of the output voltage of the transformer 240 in which the right end of the secondary winding section 250 is at a positive polarity with respect to the left end of the section 250, current flows from this right end through the current transformer 246, the current transformer 244, the secondary winding section 252 of the transformer 240, the conductor 255, the rectifier component 268 of the rectifier 260, the set of contacts 278, the operating coil 276 of the relay 274, the rectifier component 270 of the rectifier 260, and the conductor 259 to the left end of the secondary winding section 250 of the transformer 240. When the right end of the secondary winding section is at a positive polarity with respect to the left end of the section 250, current also flows from this right end through the current transformer 246, the current transformer 242, the secondary winding section 254 of the transformer 240, the conductor 256, the rectifier component 264 of the rectifier 260, the set of contacts 278, the operating coil 276 of the relay 274, the rectifier component 270 of the rectifier 260, and the conductor 259, to the left end of the secondary winding section 250 of the transformer 240.

As hereinbefore mentioned, the control means 25 effects an automatic build-up of the output voltage of the generator 12 when first starting up the apparatus illustrated in Figure 1. For instance, when first starting up this apparatus the set of contacts 278 and 280 are in the closed position as illustrated in the drawings. Thus, with the set of contacts 280 of the relay 274 in the closed position the field winding 26 of the exciter 28 is electrically connected across its armature 30 to thereby render the exciter 28 self-excited. With the exciter 28 self-excited its armature voltage rises rapidly since the residual magnetism in the exciter field 26 produces enough flux to generate armature voltage for the exciter 28. The output voltage of the generator 12 likewise rises rapidly since its field winding 14 is supplied by the rising exciter-armature voltage. The circuit for so connecting the field winding 26 of the exciter 28 across its armature 30, extends from one side of the armature 30 through the set of contacts 280 of the relay 274 and the field winding 26 of the exciter 28, to the other side of the armature 30.

When on building up the output voltage of the generator 12, a measure of the sum of the output voltage and the load current of the generator 12 reaches a predetermined value the set of contacts 278 and 280 of the relay 274 are actuated to the open position. When the set of contacts 280 is actuated to the open position the field winding 26 of the exciter 28 is disconnected from across its armature 30 and the field winding 26 is rendered under the control of the regulator 290 whose ouput voltage appears at the output of the magnetic amplifier 24. In practice, the set of contacts 280 is actuated to the open position once the output voltage of the generator 12 reaches approximately 50% of its rated output voltage. Thus, the output voltage of the generator 12 is built up from 50 to 100% rated output voltage under the control of the regulator 290 and thus substantially no transient overshoot of the output voltage of the generator 12 occurs.

When the set of contacts 280 is actuated to the open position once a measure of the sum of the output voltage and the load current of the generator 12 reaches a predetermined value the set of contacts 278 is simultaneously actuated to the open position. With the set of contacts 278 in the open position, the resistor 282 absorbs a portion of the increased output voltage of the rectifier 260 and thus limits the current flow through the operating coil 276 of the relay 274.

Once the set of contacts 280 is actuated to the open position to render the field winding 26 of the exciter 28 under the control of only the regulator 290, the set of contacts 280 remain in the open position even though a three-phase short circuit exists or a line-to-neutral short circuit exists with respect to the load conductors 13, 13', and 13''. The reason the set of contacts 280 remain in the open position under such short circuit conditions is that the short circuit current induces sufficient voltage in the current transformers 242, 244 and 246 to thus effect sufficient current flow through the operating coil 276 of the relay 274 to maintain the set of contacts 280 in the open position even though the voltage output of the transformer 240 is substantially zero. By also rendering the operating coil 276 of the relay 274 responsive to the short circuit current the exciter 28 is prevented from becoming self-excited under short circuit conditions and a high voltage transient overshoot at the output of the generator 12 is prevented when the short circuit is removed.

The operation of the regulator 290 will now be described. Assuming there is an increase in the output voltage of the generator 12 above its regulated value, the output current of the sensing network 16 increases to thereby increase the magnitude of the current flow through the control windings 86 and 90 of the magnetic amplifier 20. The increased current flow through the control windings 86 and 90 increases the magnitude of the fluxes produced thereby in the core members 80 and 82, respectively, which fluxes oppose the fluxes produced in the core members 80 and 82 by the current flow through the load windings 114 and 116, respectively, thereby decreasing the output current of the magnetic amplifier 20. With a decrease in the output current of the magnetic amplifier 20, the output of the magnetic amplifier 24 also decreases to thereby decrease the magnitude of the current flow through the field winding 26 of the exciter 28. This latter action decreases the voltage across the field winding 14 of the generator 12 to thereby return its output voltage to the regulated value.

On the other hand, assuming the output voltage of the generator 12 decreases to a value below its regulated value, the output of the sensing network 16 also decreases to thereby decrease the magnitude of the current flow through the control windings 86 and 90 of the magnetic amplifier 20. A decrease in the magnitude of the current flow through the control windings 86 and 90 decreases the magnitude of the fluxes produced thereby in the core members 80 and 82, respectively, which fluxes oppose the fluxes produced in the core members 80 and 82, respectively, by the current flow through the load windings 114 and 116, respectively, thereby increasing the output current of the magnetic amplifier 20. An increase in the output current of the magnetic amplifier 20 increases the output current of the magnetic amplifier 24 to thereby increase the magnitude of the current flow through the field winding 26 of the exciter 28, thus returning the output voltage of the generator 12 to its regulated value.

Referring to Fig. 3 there is illustrated another embodiment of the teachings of this invention, in which like components of Figs. 1 and 3 have been given the same reference characters. The main distinction between the apparatus illustrated in Figs. 1 and 3 is that in the apparatus of Fig. 3 the source of energy for exciting the field winding 14 of the generator 12 so as to build up the output voltage of the generator 12 comprises a separate source of direct current 300 instead of the exciter 28 illustrated in Fig. 1.

In particular, the set of contacts 280 of the relay 274 is interconnected with the field winding 14 of the generator 12 and with the source of direct current 300 so that when the set of contacts 280 is in the closed position the source of direct current 300 supplies energy to the field winding 14 of the generator 12. The circuit for connecting the field winding 14 of the generator 12 to the source of direct current 300 extends from one side of the source 300 through the set of contacts 280 of the relay 274, and the field winding 14 of generator 12 to the other side of the source of direct current 300. Thus, on starting up the apparatus illustrated in Fig. 3 the set of contacts 280 of the relay 274 remains closed until a measure of the sum of the output voltage and the load current of the generator 12 reaches a predetermined value. However, once this predetermined value is reached the set of contacts 280 are actuated to the open position to thus disconnect the field winding 14 of the generator 12 from the source of direct current 300 and thereby render the field winding 14 of the generator 12 under the control of the regulator 290, the output of the magnetic amplifier 24 then supplying the only energy to the field winding 14. As was the case with the apparatus illustrated in Figure 1, the regulator 290 continues to build up the output voltage of the generator 12 once the output voltage of the generator 12 has reached approximately 50% rated output voltage and the set of contacts 280 have been actuated to the open position. By so correlating the apparatus of Fig. 3 a high alternating-current voltage transient overshoot of the output voltage of the generator 12 is prevented. Since the remaining operation of the apparatus illustrated in Fig. 3 is similar to the operation of the apparatus illustrated in Fig. 1, a further description of such operation is deemed unnecessary.

The apparatus embodying the teachings of this invention has several advantages. For instance, the control means 25 for building up the output voltage of the generator 12 is totally automatic. In addition, the system voltage will build up even if the load is connected to the generator 12. Further, a false operation is not obtained even though the line voltage of the generator 12 is reduced to zero during a three-phase short circuit or when one phase-to-neutral voltage is zero during a line-to-neutral short circuit. Also, the connections between the output of the regulator 290 and the field winding 26 of the exciter 28 are never interrupted during the building up of the output voltage of the generator 12. Further, after the output voltage of the generator 12 has been built up to rated voltage, the operating coil 276 of the relay 274 is energized at all times. Therefore, the relay 274 is less likely to operate falsely under such environmental conditions as shock and vibration.

Since numerous changes may be made in the above-described circuits and apparatus, and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. In a control system for maintaining the output voltage of an alternator having a field winding substantially constant and for building up the output voltage of the alternator, the combination comprising, a regulator which receives energy from the output of the alternator, the input of the regulator being connected to be responsive to the magnitude of the output of the alternator and the output of the regulator being connected to effect a supply of energy to the field winding of the alternator, a source of energy for exciting the field winding of the alternator, the source of energy being interconnected with the field winding of the alternator and with the output of the regulator, and control means responsive to both the output voltage of the alternator and the load current of the alternator for controlling the energy that said source of energy supplies to the field winding of the alternator only until a measure of the sum of the output voltage of the alternator and the load current of the alternator reaches a predetermined value, to thus build up the output voltage of the alternator to such a value that the regulator can assume control.

2. In a control system for maintaining the output voltage of an alternator having a field winding substantially constant and for building up the output voltage of the alternator to a predetermined value, the combination comprising, a regulator including an amplifier which receives energy from the output of the alternator, the input of the regulator being connected to be responsive to the magnitude of the output of the alternator and the output of the regulator being connected to effect a supply of energy to the field winding of the alternator, a relay having an operating coil and a set of contacts, a source of energy for exciting the field winding of the alternator, the source of energy being interconnected with the field winding of the alternator and with the output of the regulator, and the set of contacts of the relay being interconnected with the source of energy so as to control the energy supplied to the field winding of the alternator by said source of energy, and a sensing circuit responsive to both the output voltage of the alternator and the load current of the alternator so as to supply current to the operating coil of the relay that is a measure of the sum of the load current and output voltage of the alternator.

3. In a control system for maintaining the output voltage of an alternator having a field winding substantially constant and for building up the output voltage of the alternator to a predetermined value, the combination comprising, a regulator including an amplifier which receives energy from the output of the alternator, the input of the regulator being connected to be responsive to the magnitude of the output of the alternator and the output of the regulator being connected to effect a supply of energy to the field winding of the alternator, a relay having an operating coil and a set of contacts, a source of energy for exciting the field winding of the alternator, the source of energy being interconnected with the field winding of the alternator and with the output of the regulator, and the set of contacts of the relay being interconnected with the source of energy so as to control the energy supplied to the field winding of the alternator by said source of energy, and a sensing circuit responsive to both the output voltage of the alternator and the load current of the alternator so as to supply current to the operating coil of the relay that is a measure of the sum of the load current and the output voltage of the alternator, said sensing circuit including a current transformer responsive to the load current of the alternator and a potential transformer responsive to the output voltage of the alternator, and a rectifier connected to be responsive to the output voltage of the current transformer and the output voltage of the potential transformer, and connected to the operating coil of the relay so as to effect a supply of direct current to the operating coil that is a measure of the sum of the output voltage and load current of the alternator.

4. In a control system for maintaining the output voltage of a three-phase generator, which has a field winding and supplies energy to three load conductors, substantially constant and for building up the output voltage of said generator to a predetermined value, the combination comprising, a regulator including a three-phase amplifier which receives energy from the output of said generator, the input of the regulator being connected to be responsive to the magnitude of the output of said generator and the output of the regulator being connected to effect a supply of energy to the field winding of said generator, a relay having an operating coil and a set of contacts, a source of energy for exciting the field winding of said generator, the source of energy being interconnected with the field winding of said generator and with the output of the regulator, and the set of contacts of the relay being interconnected with the source of energy for controlling the energy supplied to the field winding of said generator by said source of energy, and a sensing circuit responsive to both the output voltage of said generator and the load current of said generator so as to supply current to the operating coil of the relay that is a measure of the sum of the load current and output voltage of said generator, said sensing circuit including a current transformer associated with each of the three load conductors and responsive to the load current flowing therethrough, a three-phase potential transformer responsive to the output voltage of said generator, and a three-phase rectifier connected to be responsive to the output of the current transformers and the output of the three-phase potential transformer, the output of said rectifier being connected to the operating coil of the relay so as to supply direct current to the operating coil that is a measure of the sum of the output voltage and load current of said generator.

5. In a control system for maintaining the output voltage of an alternator having a field winding substantially constant and for building up the output voltage of the alternator to a predetermined value, the combination comprising, an exciter having a field winding and an armature connected to effect a supply of energy to the field winding of the alternator, a regulator including an amplifier which receives energy from the output of the alternator, the input of the regulator being connected to be responsive to the magnitude of the output of the alternator and the output of the regulator being connected to energize the field winding of the exciter, a relay having an operating coil and a set of contacts, a sensing circuit responsive to both the output voltage of the alternator and the load current of the alternator so as to effect a supply of current to the operating coil of the relay that is a measure of the sum of the load current and the output voltage of the alternator, and circuit means interconnecting the set of contacts of the relay with the armature and with the field winding of the exciter for effecting a connection of the field winding of the exciter across its armature when said measure of the sum is below a predetermined value and for effecting a disconnection of the field winding of the exciter from across its armature when said measure of the sum is above the predetermined value.

6. In a control system for maintaining the output voltage of an alternator having a field winding substantially constant and for building up the output voltage of the alternator to a predetermined value, the combination comprising, an exciter having a field winding and an armature connected to effect a supply of energy to the field winding of the alternator, a regulator including an amplifier which receives energy from the output of the alternator, the input of the regulator being connected to be responsive to the magnitude of the output of the alternator and the output of the regulator being connected to energize the field winding of the exciter, a relay having an operating coil and a set of contacts, a sensing circuit responsive to both the output voltage of the alternator and the load current of the alternator, said sensing circuit including a current transformer responsive to the load current of the alternator and a potential transformer responsive to the output voltage of the alternator, and a rectifier responsive to the output of the current transformer and to the output of the potential transformer for effecting a supply of direct current to the operating coil of the relay that is a measure of the sum of the output voltage of the current transformer and the output voltage of the potential transformer, and circuit means interconnected with the set of contacts of the relay and with the armature and field winding of the exciter for effecting a connection of the field winding of the exciter across its armature when said measure of the sum is below a predetermined value and for effecting a disconnection of the field winding of the exciter from across its armature when said measure of the sum is above the predetermined value.

7. In a control system for maintaining the output voltage of a three-phase generator, which has a field winding and supplies energy to three load conductors, substantially constant and for building up the output voltage of said generator to a predetermined value, the combination comprising, an exciter having a field winding and an armature connected to effect a supply of energy to the field winding of the alternator, a regulator including a three-phase magnetic amplifier, said amplifier including load windings and control windings, the load windings being connected to receive energy from the output of said generator and the control windings being responsive to the magnitude of the output voltage of said generator, and the load windings being connected to energize the field winding of the exciter, a relay having an operating coil and a set of contacts, a sensing circuit responsive to the output voltage of said generator to the load current of said generator, said sensing circuit including a current transformer associated with each of the three load conductors and responsive to the load current flowing therethrough, a three-phase potential transformer responsive to the output voltage of said generator, and a three-phase rectifier connected to be responsive to the output voltage of the current transformers and to the output voltages of the three-phase potential transformer, the output of said rectifier being connected to the operating coil of the relay so as to supply direct current to the operating coil that is a measure of the sum of the output voltage and load current of said generator, and circuit means interconnected with the set of contacts of the relay and with the armature and field winding of the exciter for effecting a connection of the field winding of the exciter across its armature when said measure of the sum is below a predetermined value and for effecting a disconnection of the field winding of the exciter from across its armature when said measure of the sum is above a predetermined value.

8. In a control system for maintaining the output voltage of a three-phase generator, which has a field winding and supplies energy to three load conductors, substantially constant and for building up the output voltage of said generator to a predetermined value, the combination comprising, an exciter having a field winding and an armature connected to effect a supply of energy to the field winding of said generator, a regulator including a three-phase magnetic amplifier, the three-phase magnetic amplifier including load windings which receive energy from the output of said generator and control windings responsive to the magnitude of the output voltage of said generator, and the load windings being interconnected with the field winding of the exciter, a relay having an operating coil and two sets of contacts, a sensing circuit responsive to both the output voltage of said generator and the load current of said generator, said sensing circuit including a current transformer associated with each of the three load conductors and responsive to the load current flowing therethrough, a three-phase potential transformer responsive to the output voltage of said generator, and a three-phase rectifier connected to be responsive to the output voltages of the current transformers and the output voltages of the three-phase potential transformer so as to produce at the output of the three-phase rectifier a voltage that is a measure of the sum of the output voltage and load current of said generator, a resistor, the resistor being connected in series circuit relationship with the operating coil of the relay and the series circuit being connected across the output of the three-phase rectifier, circuit means connecting one of the two sets of contacts of the relay across the resistor so that when said one of the two sets of contacts is in the closed position a predetermined portion of the resistor is by-passed, and other circuit means interconnected with the other of the two sets of contacts of the relay and with the armature and field winding of the exciter for effecting a connection of the field winding of the exciter across its armature when said measure of the sum is below a predetermined value and for effecting a disconnection of the field winding of the exciter from across its armature when said measure of the sum is above the predetermined value.

9. In a control system for maintaining the output voltage of an alternator having a field winding substantially constant and for building up the output voltage of the alternator to a predetermined value, the combination comprising, a regulator including an amplifier which receives energy from the output of the alternator, the input of the regulator being connected to be responsive to the magnitude of the output of the alternator and the output of the regulator being connected to energize the field winding of the alternator, a relay having an operating coil and a set of contacts, a sensing circuit responsive to both the output voltage of the alternator and the load current of the alternator so as to supply current to the operating coil of the relay that is a measure of the sum of the load current and the output voltage of the alternator, a separate source of direct current, and circuit means interconnected with the set of contacts of the relay, with the field winding of the alternator, and with the separate source of direct current so that when said measure of the sum is below a predetermined value the separate source of direct current supplies energy to the field winding of the alternator.

10. In a control system for maintaining the output voltage of an alternator having a field winding substantially constant and for building up the output voltage of the alternator to a predetermined value, the combination comprising, a regulator including an amplifier which receives energy from the output of the alternator, the input of the regulator being connected to be responsive to the magnitude of the output of the alternator and the output of the regulator being connected to energize the field winding of the alternator, a relay having an operating coil and a set of contacts, a sensing circuit responsive to both the output voltage of the alternator and the load current of the alternator, said sensing circuit including a current transformer responsive to the load current of the alternator and a potential transformer responsive to the output voltage of the alternator, and a rectifier connected to be responsive to the output voltage of the current transformer and the output voltage of the potential transformer so as to produce at the output of the rectifier a direct current voltage that is a measure of the sum of the output voltage and load current of the alternator, circuit means for connecting the output of the rectifier to the operating coil of the relay, a separate source of direct current, and other circuit means interconnected with the set of contacts of the relay, with the field winding of the alternator, and with the separate source of direct current so that the separate source of direct current supplies energy to the field winding of the alternator when said measure of the sum is below a predetermined value.

11. In a control system for maintaining the output voltage of a three-phase generator, which has a field winding and supplies energy to three load conductors, substantially constant and for building up the output voltage of said generator to a predetermined value, the combination comprising, a regulator including a three-phase magnetic amplifier, said amplifier including load windings which receive energy from the output of said generator and control windings which are responsive to the magnitude of the output voltage of said generator, the load windings of said amplifier being connected to supply energy to the field winding of said generator, a relay having an operating coil and a set of contacts, a sensing circuit responsive to both the output voltage of said generator and the load current transformer of said generator, said sensing circuit including a current transformer associated with each of the three load conductors and responsive to the load current flowing therethrough, a three-phase potential transformer responsive to the output voltage of said generator, and a three-phase rectifier connected to be responsive to the output voltages of the current transformers and the output voltages of the three-phase potential transformer so as to produce at the output of said rectifier a direct-current voltage that is a measure of the sum of the output voltage and load current of said generator, circuit means for connecting the output of said rectifier to the operating coil of the relay, a separate source of direct current, and other circuit means interconnected with the set of contacts of the relay, with the field winding of said generator, and with the separate source of direct current so that the separate source of direct current supplies energy to the field winding of said generator when said measure of the sum is below a predetermined value.

12. In a control system for maintaining the output voltage of a three-phase generator, which has a field winding and supplies energy to three load conductors, substantially constant and for building up the output voltage of said generator to a predetermined value, the combination comprising, a regulator including a three-phase magnetic amplifier, said amplifier including load windings which receive energy from the output of said generator and control windings which are responsive to the magnitude of the output voltage of said generator, the load windings of said amplifier being connected to effect a supply of energy to the field winding of said generator, a relay having an operating coil and two sets of contacts, a sensing circuit responsive to both the output voltage of said generator and the load current of said generator, said sensing circuit including a current transformer associated with each of the three load conductors and responsive to the load current flowing therethrough, a three-phase potential transformer responsive to the output voltage of said generator, and a three-phase rectifier connected to be responsive to the output voltages of the current transformers and the output voltages of the three-phase potential transformer so as to produce at the output of said rectifier a direct-current voltage that is a measure of the sum of the output voltage and load current of said generator, a resistor, the resistor being connected in series circuit relationship with the operating coil of the relay and the series circuit being connected across the output of said rectifier, circuit means for connecting one of the two sets of contacts of the relay across the resistor so that when said measure of the sum is below a predetermined value a predetermined portion of the resistor is by-passed, a separate source of direct current, and other circuit means for interconnecting the other of the two sets of contacts of the relay with the field winding of said generator and with the separate source of direct current so that the separate source of direct current supplies energy to the field winding of said generator when said measure of the sum is below a predetermined value.

References Cited in the file of this patent

UNITED STATES PATENTS

| | | |
|---|---|---|
| 1,710,755 | West | Apr. 30, 1929 |

FOREIGN PATENTS

| | | |
|---|---|---|
| 834,163 | France | Nov. 15, 1938 |